(12) United States Patent
Enomoto et al.

(10) Patent No.: US 10,359,828 B2
(45) Date of Patent: Jul. 23, 2019

(54) BATTERY PACK AND METHOD FOR CONTROLLING DISCHARGE FROM SECONDARY BATTERY

(71) Applicant: SANYO Electric Co., Ltd., Osaka (JP)

(72) Inventors: Naofumi Enomoto, Hyogo (JP); Ryosuke Yamamoto, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 61 days.

(21) Appl. No.: 15/578,750

(22) PCT Filed: Jun. 6, 2016

(86) PCT No.: PCT/JP2016/002716
§ 371 (c)(1),
(2) Date: Dec. 1, 2017

(87) PCT Pub. No.: WO2017/006514
PCT Pub. Date: Jan. 12, 2017

(65) Prior Publication Data
US 2018/0173292 A1    Jun. 21, 2018

(30) Foreign Application Priority Data

Jul. 6, 2015    (JP) ................... 2015-134948

(51) Int. Cl.
*H02J 7/00*    (2006.01)
*H02J 9/00*    (2006.01)
(Continued)

(52) U.S. Cl.
CPC ........ *G06F 1/3212* (2013.01); *H01M 10/052* (2013.01); *H01M 10/0525* (2013.01);
(Continued)

(58) Field of Classification Search
CPC .......... H02J 7/0063; H02J 2007/0067; H01M 10/441; G06F 1/3212
(Continued)

(56) References Cited

U.S. PATENT DOCUMENTS

2004/0178766 A1 * 9/2004 Bucur ................... H02J 7/0013
                                                        320/112
2015/0054467 A1 * 2/2015 Takano ................. H01M 10/48
                                                        320/136

FOREIGN PATENT DOCUMENTS

JP    2013-076680    4/2013

OTHER PUBLICATIONS

International Search Report of PCT application No. PCT/JP2016/002716 dated Aug. 16, 2016.

* cited by examiner

*Primary Examiner* — David V Henze-Gongola
(74) *Attorney, Agent, or Firm* — Wenderoth, Lind & Ponack, L.L.P.

(57) ABSTRACT

A battery pack includes a secondary battery, a discharge controlling circuit configured to discharge the secondary battery and control an output current supplied to battery driven equipment, a wake-up current detection circuit configured to, in a power saving state in which the output current supplied to the battery driven equipment by the discharge controlling circuit is reduced from a normal non-power saving state, detect that the output current exceeds a wake-up current threshold to make the battery pack transition from the power saving state to the non-power saving state, and a calibration member configured to calibrate a reference point of the wake-up current detection circuit. The wake-up current detection circuit is configured to operate in the power saving state and stop its operation in the non- (Continued)

power saving state, and the calibration member is configured to execute a calibration operation at a predetermined timing in the power saving state.

12 Claims, 3 Drawing Sheets (51) Int. Cl.
    *H01M 10/44*     (2006.01)
    *H01M 10/48*     (2006.01)
    *G06F 1/3212*     (2019.01)
    *H01M 10/052*     (2010.01)
    *H01M 10/0525*     (2010.01)

(52) U.S. Cl.
    CPC ....... *H01M 10/441* (2013.01); *H01M 10/482* (2013.01); *H02J 7/0063* (2013.01); *H02J 9/005* (2013.01); *H01M 2220/20* (2013.01); *H02J 2007/0067* (2013.01); *Y02E 60/122* (2013.01)

(58) Field of Classification Search
    USPC .......................................... 320/127, 135, 136
    See application file for complete search history.

BATTERY PACK AND METHOD FOR CONTROLLING DISCHARGE FROM SECONDARY BATTERY

This application is a U.S. national stage application of the PCT International Application No. PCT/JP2016/002716 filed on Jun. 6, 2016, which claims the benefit of foreign priority of Japanese patent application 2015-134948 filed on Jul. 6, 2015, the contents all of which are incorporated herein by reference.

TECHNICAL FIELD

The present invention relates to a battery pack and a method for controlling discharge from a secondary battery.

BACKGROUND ART

A secondary battery has been recently used as a power source for driving mobile electronic equipment such as a notebook computer and a tablet terminal. A battery pack using such a secondary battery includes one that has a power saving state (off state) suppressing power consumption when working current is low to extend a battery life of the secondary battery besides a non-power saving state (on state) outputting normal discharging current. The timing of transition from such the power saving state to the non-power saving state is performed by, for example, detecting that a current amount required from electronic equipment on a load side becomes not less than a predetermined value. For example, in the notebook computer, when an interval of time during no usage has passed not less than a predetermined period, the notebook computer automatically transitions to a sleep mode (power saving state), and when a certain input such as a new keyboard operation is detected, the note book computer automatically returns from the sleep mode to normal operation (non-power saving state).

Appropriate returning from the power saving state to the non-power saving state in this manner needs to precisely detect a current (wake-up current) of not less than a predetermined value that becomes a threshold to return from the power saving state to the non-power saving state. The detection of the wake-up current is performed in a wake-up current detection circuit. To precisely detect the wake-up current by the wake-up current detection circuit, a zero point correction to correct a zero point of the wake-up current detection circuit (calibration operation) is needed. Such a calibration operation is typically performed during driving electronically driven equipment.

However, the wake-up current detection circuit has temperature characteristics, so that although current can be correctly detected with respect to a set value when the ambient temperature under which calibration operation has performed is maintained, a detection voltage disadvantageously fluctuates when the ambient temperature is changed, which can cause failure of detection at an intended current value. In this case, the wake-up current fails to be precisely detected, failing to detect a current value that should detect wake-up or causing, in an opposite manner, a detection of wake-up at a current value that should not be detected, which can result in failure of correct return from the power saving state to the non-power saving state.

CITATION LIST

Patent Literature

PTL1: Unexamined Japanese Patent Publication 2013-76680

SUMMARY OF THE INVENTION

The present invention has conceived in light of such conventional problems. An object of the present invention is to provide a method for controlling discharge from a secondary battery that makes it possible to precisely detect a wake-up current, and a discharge circuit.

According to a battery pack according to a first aspect of the present invention, the battery pack is connected to battery driven equipment and supplies a driving current to the battery driven equipment. The battery pack includes a secondary battery, a discharge controlling circuit configured to discharge the secondary battery and control an output current supplied to the battery driven equipment, a wake-up current detection circuit configured to, in a power saving state in which the output current supplied to the battery driven equipment by the discharge controlling circuit is reduced from a normal non-power saving state, detect that the output current exceeds a predetermined wake-up current threshold to make the battery pack transition from the power saving state to the non-power saving state, and a calibration member configured to calibrate a reference point of the wake-up current detection circuit. The wake-up current detection circuit is configured to operate in the power saving state and stop operating in the non-power saving state, and the calibration member can be configured to execute a calibration operation at a predetermined timing in the power saving state. The above configuration makes the calibration member reset a detection voltage not only at the time of startup but also in the power saving state to absorb fluctuation of the detection voltage due to temperature characteristics for preventing false detection, making it possible to enhance reliability.

Furthermore, according to a battery pack according to a second aspect, the calibration member can be configured to execute the calibration operation at a predetermined first cycle after transition from the non-power saving state to the power saving state. The above configuration makes calibration member reset a detection voltage not only at the time of startup but also in the power saving state periodically to absorb fluctuation of the detection voltage due to temperature characteristics for preventing false detection, making it possible to enhance reliability.

Furthermore, according to a battery pack according to a third aspect, the calibration member can be configured to execute the calibration operation at a timing of transition from the non-power saving state to the power saving state. The above configuration makes calibration member reset a detection voltage not only at the time of startup but also in the power saving state periodically to absorb fluctuation of the detection voltage due to temperature characteristics for preventing false detection, making it possible to enhance reliability.

Furthermore, according to a battery pack according to a fourth aspect, the reference point of the wake-up current detection circuit is a zero point where the output current becomes zero, and the calibration member can correct the zero point as the calibration operation.

Furthermore, according to a battery pack according to a fifth aspect, the calibration member can be configured to determine the zero point of the wake-up current detection circuit and set an offset value that adjusts a detection voltage to be an intended voltage.

Furthermore, according to a battery pack according to a sixth aspect, the wake-up current detection circuit includes a comparator for detecting wake-up current, and the calibration member can be configured to calibrate a reference value of the comparator for detecting wake-up current.

Furthermore, a battery pack according to a seventh aspect further includes an output current detection circuit configured to detect the output current in the non-power saving state, and a current detection resistor configured to detect a voltage dependent on the output current of the secondary battery. The output current detection circuit includes a comparator for detecting output current, and the comparator for detecting wake-up current and the comparator for detecting output current can be connected to the common current detection resistor. The above configuration detects the wake-up current and the output current using the common current detection resistor and makes detection accuracy of a minute wake-up current and detection accuracy of larger output current different by performing the calibration operation to the comparator for detecting wake-up current, making it possible to effectively use a bit number.

Furthermore, according to a battery pack according to an eighth aspect, the output current detection circuit executes a detection operation for detecting output current in the non-power saving state at a predetermined second cycle, and the second cycle can be made shorter than the first cycle. The above configuration shortens the cycle of detecting the output current in the non-power saving state than the cycle in the power saving state to improve accuracy of current integration, making it possible to gain a more precise battery state.

According to a battery pack according to a ninth aspect, the battery pack is connected to battery driven equipment and supplies a driving current to the battery driven equipment. The battery pack includes a secondary battery, a discharge controlling circuit configured to discharge the secondary battery and control an output current to be supplied to the battery driven equipment, a wake-up current detection circuit configured to, in a power saving state in which the output current supplied to the battery driven equipment by the discharge controlling circuit is reduced from a normal non-power saving state, detect that the output current exceeds a wake-up current threshold to make the battery pack transition from the power saving state to the non-power saving state, and a calibration member configured to calibrate a reference point of the wake-up current detection circuit. The wake-up current detection circuit is configured to operate in the power saving state and stop operating in the non-power saving state, and the calibration member can be configured to execute a calibration operation at a timing of transition from the non-power saving state to the power saving state. The above configuration makes calibration member reset a detection voltage for each transition to the power saving state to absorb fluctuation of the detection voltage due to temperature characteristics for preventing false detection, making it possible to enhance reliability.

Furthermore, according to a method for controlling discharge from a secondary battery according to a tenth aspect, the method for controlling discharge from a secondary battery connects a battery pack to battery driven equipment to supply a driving current to the battery driven equipment. The method can include a step of monitoring an output current supplied to the battery driven equipment from the battery pack and making a wake-up current detection circuit make the battery pack transition to a power saving state in which power consumption of the battery pack is reduced from a normal non-power saving state when the detected output current is not more than a predetermined wake-up current threshold, and a step of making calibration member perform a calibration operation for calibrating a reference point of the wake-up current detection circuit at a predetermined timing in the power saving state, while making the wake-up current detection circuit monitor whether the output current exceeds the predetermined wake-up current threshold in the power saving state to make, when that the output current exceeds the predetermined wake-up current threshold is detected, the battery pack transition from the power saving state to the non-power saving state. This makes calibration member reset a detection voltage not only at the time of startup but also in the power saving state to absorb fluctuation of the detection voltage due to temperature characteristics for preventing false detection, making it possible to enhance reliability.

Furthermore, according to a method for controlling discharge from a secondary battery according to an eleventh aspect, the calibration operation can be performed at a constant cycle after transition from the non-power saving state to the power saving state. This makes calibration member reset a detection voltage not only at the time of startup but also in the power saving state periodically to absorb fluctuation of the detection voltage due to temperature characteristics for preventing false detection, making it possible to enhance reliability.

Furthermore, according to a method for controlling discharge from a secondary battery according to a twelfth aspect, the calibration operation can be performed at a timing of transition from the non-power saving state to the power saving state. This makes calibration member reset a detection voltage not only at the time of startup but also in the power saving state periodically to absorb fluctuation of the detection voltage due to temperature characteristics for preventing false detection, making it possible to enhance reliability.

DESCRIPTION OF EMBODIMENT

Figure 1:
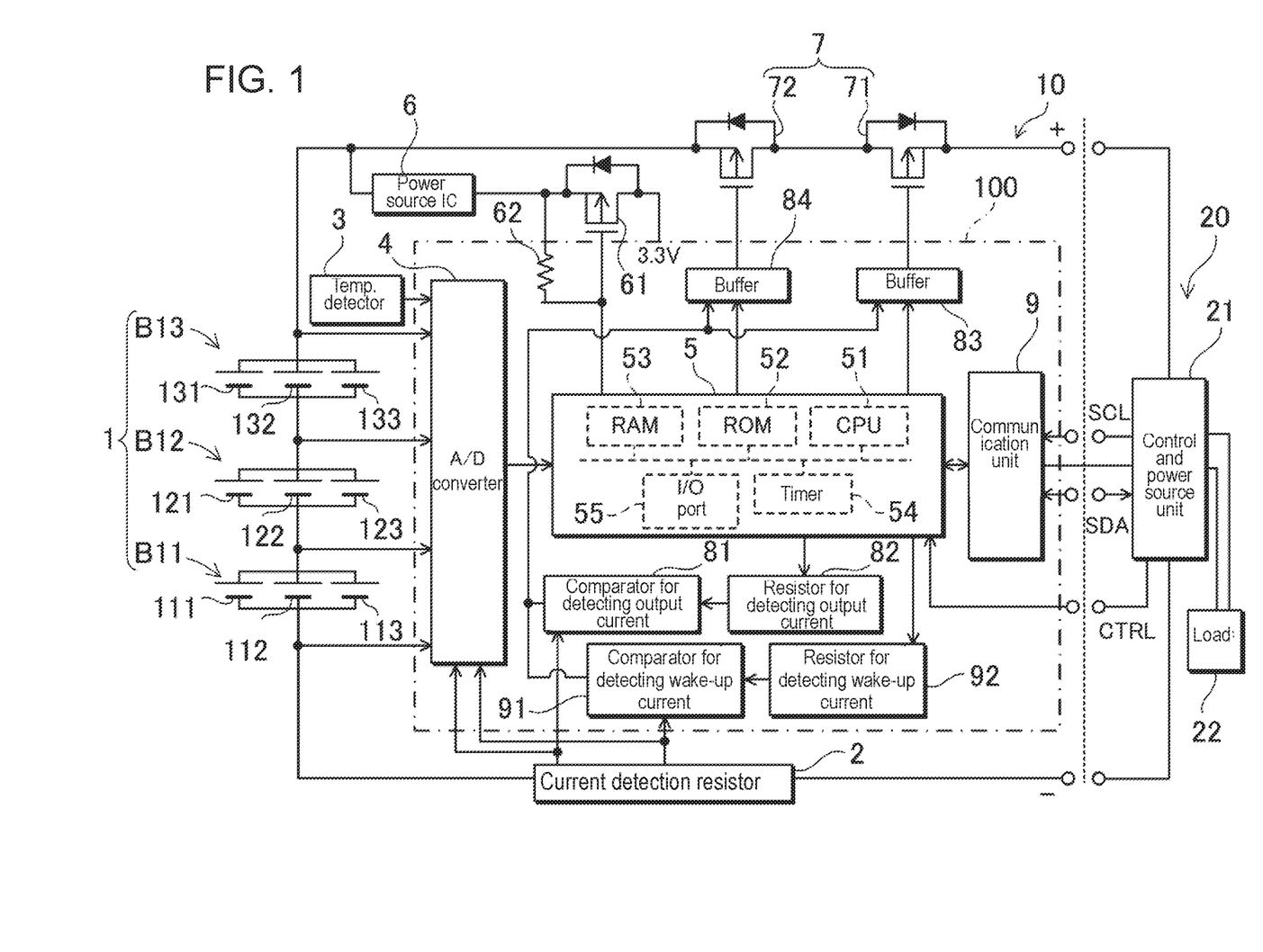
FIG. 1 is a circuit diagram of a battery pack according to an exemplary embodiment of the present invention.

FIG. 1 is a block diagram illustrating a configuration example of a battery pack according to an exemplary embodiment of the present invention. Battery pack 10 illustrated in the drawing includes secondary battery 1, controller 5, an output current detection circuit, a wake-up current detection circuit, and current detection resistor 2. Battery pack 10 is capable of transition to any of a normal non-power saving state in which an output current is supplied to battery driven equipment 20, a power saving state in which the output current is reduced as compared with the non-power saving state, and a shutdown state.

Controller 5 includes a discharge controlling circuit and a calibration member (described below). The discharge controlling circuit makes secondary battery 1 be discharged and controls the output current to be supplied to battery driven equipment 20.

The output current detection circuit is a member for detecting output current in the non-power saving state. The output current detection circuit includes comparator 81 for detecting output current and resistor 82 for detecting output current. Comparator 81 for detecting output current is connected to current detection resistor 2. Current detection resistor 2 is a member for detecting the voltage dependent on the output current of secondary battery 1.

On the other hand, the wake-up current detection circuit is a member for detecting output current (wake-up current) in the power saving state. The wake-up current detection circuit detects that the output current has exceeded a predetermined wake-up current threshold to make battery pack 10 transition from the power saving state to the non-power saving state. The wake-up current detection circuit operates in the power saving state and stops its operation in the non-power saving state. In the example of FIG. 1, the wake-up current detection circuit includes comparator 91 for detecting wake-up current and resistor 92 for detecting wake-up current.

(Calibration Member)

The calibration member is a member for calibrating a reference point of the wake-up current detection circuit. The calibration member calibrates the reference value of comparator 91 for detecting wake-up current at a predetermined timing in the power saving state besides the time of startup of battery pack 10. This configuration makes the calibration member reset a detection voltage not only at the time of startup but also in the power saving state periodically to absorb variation of the detection voltage due to temperature characteristics for preventing false detection, making it possible to enhance reliability.

(Execution Timing of Calibration Operation)

The timing of calibration operation executed by the calibration member is a predetermined first cycle after transition to the power saving state from the non-power saving state. This makes it possible to periodically reset the detection voltage in the power saving state. This makes it possible to absorb the variation of the detection voltage due to the temperature characteristics to prevent the false detection. The calibration member is also capable of performing the calibration operation at a timing of transition from the non-power saving state to the power saving state. This certainly calibrates the reference point not only at the time of startup but also upon transition to the power saving state, anticipating accurate detection of the wake-up current likewise dependent on the ambient temperature.

(Reference Point)

The reference point may preferably be a zero point where the current of the wake-up current detection circuit becomes zero. The calibration member determines the zero point of the wake-up current detection circuit and sets an offset value that adjusts the detection voltage to be an intended voltage.

Both of comparator 91 for detecting wake-up current and comparator 81 for detecting output current are connected to common current detection resistor 2. Such a configuration detects the wake-up current and the output current using common current detection resistor 2 and makes detection accuracy of a minute wake-up current and detection accuracy of larger output current different by performing the calibration operation to comparator 91 for detecting wake-up current, making it possible to effectively use a bit number.

(Battery Driven Equipment 20)

Battery pack 10 is detachably attached to battery driven equipment 20 and supplies a driving current to battery driven equipment 20. Examples of battery driven equipment 20 include a personal computer (PC), a mobile terminal, an electrical power tool, and an electrically assisted bicycle. Battery pack 10 includes battery 1 in which battery blocks B11, B12, and B13 are connected in series in this order, battery block B11 including three battery cells 111, 112, and 113 connected in parallel in sequence, battery block B12 including three battery cells 121, 122, and 123 connected in parallel in sequence, and battery block B 13 including three battery cells 131, 132, and 133 connected in parallel in sequence, each of the battery cells consisting of a lithium-ion secondary battery. Battery cell 1 is configured such that a positive electrode of battery block B13 and a negative electrode of battery block B11 respectively become its positive terminal and negative terminal.

The voltages of battery blocks B11, B12, and B13 are independently applied to respective analog input terminals of A/D converter 4, converted into respective digital voltage values, and applied to controller 5 consisting of a microcomputer from a digital output terminal of A/D converter 4. Furthermore, to the analog input terminals of A/D converter 4, a detection output of temperature detector 3 arranged closely to battery 1 and configured to detect the temperature of battery 1 by a circuit including a thermistor, and detection outputs of current detection resistor 2 interposed in a charge and discharge path on the side of the negative electrode terminal of the battery 1 and configured to detect a charging current and a discharging current of battery 1 are provided. The detection outputs are converted into respective digital detection values and applied to controller 5 from the digital output terminal of A/D converter 4. Furthermore, the detection output of the current detection resistor 2 is applied to comparator 81 for detecting output current that detects a current specified as a value preliminarily set in resistor 82 for detecting output current. Comparator 81 for detecting output current calibrates the output current detection circuit, and the detection output of the output current detection circuit is applied to buffers 83, 84.

Circuit breaker 7 including P-channel type metal oxide semiconductor field effect transistors (MOSFETs) 71, 72 that respectively cut off the charging current and the discharging current are interposed in a charge and discharge path on the positive electrode terminal side of battery 1. MOSFETs 71, 72 are connected in series with their drain electrodes being opposed to each other. A diode connected in parallel between the drain electrode and a source electrode of each of MOSFETs 71, 72 is a parasitic diode (body diode). Furthermore, an input terminal of power source (regulator) IC 6 is connected to the charge and discharge path on the side of the positive electrode terminal of battery 1, and a direct-current power source of 3.3 V regulated by power source IC 6 is configured to be applied to a 3.3 V power source input terminal of control substrate 100 mounting thereon controller 5 via a source electrode and drain electrode of P-channel type MOSFET 61. Resistor 62 is connected between the source electrode and a gate electrode of MOSFET 61.

Controller 5 includes central processing unit (CPU) 51, and CPU 51 is connected, through a buss, with read-only memory (ROM) 52 that stores information such as programs, random access memory (RAM) 53 that stores temporally generated information, timer 54 that measures time, and I/O port 55 that performs input and output to and from each part in battery pack 10. To I/O port 55, the digital output terminal of A/D converter 4, buffers 83, 84 for respectively transmitting an ON/OFF signal to the gate electrodes of MOSFETs 71, 72, resistor 82 for detecting output current for storing detection information of comparator 81 for detecting output current and a set value to comparator 81 for detecting output current, a CTRL signal applied from control and power source unit 21, and communication unit 9 that communicates with control and power source unit 21 included in battery driven equipment 20 are connected. When at least one of a detection signal from comparator 81 for detecting output current and an OFF signal from I/O port 55 is applied, buffers 83, 84 are configured to respectively transmit respective applied signals, as OFF signals, to the gate electrodes of MOSFETs 71, 72. Note that at least controller 5, A/D converter 4, comparator 81 for detecting output current, resistor 82 for detecting output current, buffers 83, 84, and communication unit 9 are mounted on control substrate 100.

CPU 51 executes processing such as calculation, and input and output in accordance with a control program preliminarily stored in ROM 52. For example, CPU 51 imports voltage values of battery blocks B11, B12, and B13, and a detection value of a charging or discharging current of battery 1 at a constant second cycle (e.g., 250 ms), and integrates a remaining capacity of battery 1 on the basis of the imported voltage values and the detection value, for storing in RAM 53. CPU 51 also creates data of the remaining capacity and outputs the data of the remaining capacity from communication unit 9 by writing the created data in a resistor (not shown) of communication unit 9. ROM 52 is a non-volatile memory consisting of an electrically erasable programmable ROM (EEPROM) or a flash memory, and ROM 52 stores, besides a program, a learning value of a battery capacity, a number of cycles of charge and discharge, and various set data.

Breaker 7 is configured to make the drain electrode and the source electrode of each of MOSFETs 71, 72 be conducted by applying an ON signal of a low (L) level to each of the gate electrodes of MOSFETs 71, 72 via buffers 83, 84 from I/O port 55 when a detection output from comparator 81 for detecting output current is absence. When the charging current of battery 1 is cut off, conduction between the drain electrode and the source electrode of MOSFET 71 is cut off by applying an OFF signal of a high (H) level to the gate electrode of MOSFETs 71 via buffer 83 from I/O port 55. Likewise, when the discharging current of battery 1 is cut off, the conduction between the drain electrode and the source electrode of MOSFET 72 is cut off by applying an OFF signal of a high (H) level to the gate electrode of MOSFET 72 via buffer 84 from I/O port 55. When battery 1 is in an appropriately charged state, both of MOSFETs 71, 72 of breaker 7 are in an ON state, so that battery 1 is in a state capable of discharging and charging.

Battery driven equipment 20 includes load 22 connected to control and power source unit 21. Control and power source unit 21 drives load 22 by being supplied with electric power from a commercial electric power source, and supplies the charging current to the charge and discharge path of battery 1. Furthermore, control and power source unit 21 drives load 22 by the discharging current supplied from the charge and discharge path of battery 1 when the electric power from the commercial electric power source is cut off. When battery 1 charged by control and power source unit 21 is a lithium ion battery, a constant current (a maximum current is about 0.5 C to 1 C) and constant voltage (a maximum voltage is about 4.2 V to 4.4 V/battery cell) charge in which the maximum current and the maximum voltage are regulated is performed, and it is regarded as full charge under the condition where a terminal voltage of battery 1 is not less than a predetermined value and the charging current is not more than a predetermined value.

Between control and power source unit 21 and communication unit 9, communication based on a system management bus (SMBus) system is performed in which control and power source unit 21 is its master and communication unit 9 is its slave. In this case, serial clock (SCL) is supplied from control and power source unit 21, and serial data (SDA) is transmitted and received in both directions between control and power source unit 21 and communication unit 9. In the exemplary embodiment, control and power source unit 21 polls communication unit 9 at a cycle of two seconds and reads out the content of the resistor of the communication unit 9. This poling makes, for example, the data of the remaining capacity of battery 1 be transferred to control and power source unit 21 from communication unit 9 at the cycle of two seconds and displayed as a value (%) of the remaining capacity on a display equipped in battery driven equipment 20. Two seconds of the above polling cycle is a value determined by control and power source unit 21. A CTRL signal other than the above communication is applied to controller 5 from control and power source unit 21, and the CTRL signal is made ON when battery driven equipment 20 is in the power saving state such as a standby mode.

The remaining capacity of battery 1 is calculated by subtracting a discharged capacity from the learning capacity (value expressed by Ah or Wh) of battery 1 as an integrated amount of current or an integrated amount of electric power. The remaining capacity is expressed by a percentage in which learning capacity is 100%. The learning capacity of battery 1 may be an integrated amount of discharging current or discharging electric power while battery 1 is discharged to a discharge termination voltage from a full charged state, or may be an integrated amount of discharging current or discharging electric power while battery 1 is charged to the full charged state from a state of being discharged to the discharge termination voltage. Controller 5 continues to consume a current of several hundred μA for only integrating the remaining capacity, but when any of voltages of respective battery blocks B11, B12, and B13 is lowered to a not more than discharge termination voltage, controller 5 is shutdown to prevent over-discharging of battery 1. This makes a leak current flown from battery 1 be about 30 μA.

When controller 5 is shut down, the gate electrode and the source electrode of MOSFET 61 connected to the output terminal of power source IC 6 become the same potential via resistor 62, thereby making MOSFET 61 maintain an OFF state. When charging of battery 1 from control and power source unit 10 is started in this state, an ON signal having an L level is forcibly applied to the gate electrode of MOSFET 61 from a circuit to make MOSEFT 61 ON, thereby making the shut-down of controller 5 be canceled. An ON signal having the L level is continuously applied to the gate electrode of MOSFET 61 from I/O port 55 right after CPU 51 of controller 5 has started its operation. When the controller 5 is shut down by processing of CPU 51, an OFF signal having a H level is applied to the gate electrode of MOSFET 61.

Next, an operation state of the controller 5 will be described. When normal charging or discharging is performed in battery pack 10, controller 5 is in the non-power saving state. When controller 5 is in the shutdown state, as described above, supplying a power source of 3.3 V to controller 5 is stopped. On the other hand, when controller 5 is in the power saving state, a clock of 4 MHz among clocks of 4 MHz and 32 kHz applied to CPU 51 from a clock supplying unit is stopped, thereby reducing electric power consumption.

(Power Saving State)

Conditions to transition from the non-power saving state to the power saving state include a case where, during a predetermined period, no communication exists between battery pack 10 and battery driven equipment 20 and the output current is not more than a predetermined value. As an example, controller 5 transitions from the non-power saving state to the power saving state when the following condition (1) is satisfied and condition (2) or condition (3) is satisfied. Condition (1) is a case where "0 mA≤ discharging current ≤100 mA", condition (2) is a case where serial data (SDA) or a serial clock (SCL) keeps LOW for not less than two seconds, and condition (3) is a case where communication between communication unit 9 and control and power source unit 21 is disrupted for a predetermined time (e.g., for four seconds).

(Non-Power Saving State)

Furthermore, controller 5 transitions from the power saving state to the non-power saving state when, for example, any of following conditions (4) to (6) is satisfied. Condition (4) is a case where the communication between communication unit 9 and control and power source unit 21 is established, condition (5) is a case where "100 mA<discharging current", and condition (6) is a case where "0 mA<charging current".

(Shutdown Sate)

The condition that controller 5 transitions from the non-power saving state or the power saving state to the shutdown state is that any of voltages of respective battery blocks B11, B12, and B13 is lowered to not more than a predetermined voltage (e.g., 2.3 V). Furthermore, the condition that controller 5 transitions to the non-power saving state from the shutdown state is that a charging voltage of about not less than 5 V is applied to the charge and discharge path of battery 1 and, as described above, an ON signal having the L level is forcibly applied to the gate electrode of MOSFET 61.

Herein, detection of current by comparator 81 for detecting output current will be described. Comparator 81 for detecting output current is capable of detecting current in a case where an absolute value of the voltage across current detection resistor 2 is within ranges of 50 mV to 200 mV and 25 mV to 100 mV as current value 1 and current value 2, respectively. Current capable of being detected as current value 1 and current value 2 and a delay time are determined by set values set in resistor 82 for detecting output current via I/O port 55 from CPU 51. In the exemplary embodiment, the value of current detection resistor 2 is 2.5 mΩ because of limitation of an amount of heat generation due to a voltage drop generated in current detection resistor 2 during normal discharge and charge. Herein, for example, an overcurrent of 20 A (hereinafter referred to as overcurrent 1) is assumed to be detected by current value 1, and an appropriate set value is set in resistor 82 for detecting output current. When overcurrent 1 is detected by comparator 81 for detecting output current, the detected signal is applied to the gate electrodes of MOSFETs 71, 72 via buffers 83, 84, respectively, thereby cutting off the discharging current and the charging current.

Detection of overcurrent 1 by above current value 1 supposes a case where battery driven equipment 20 that possibly generate too large discharging current is in a normal operation mode, but when battery driven equipment 20 is in the power saving mode such as the standby mode, an overcurrent smaller than overcurrent 1 (hereinafter, referred to as overcurrent 2) needs to be detected.

Comparator 91 for detecting wake-up current has a function of providing information that can be a trigger for making controller 5 transition from the power saving state to the non-power saving state. This function makes the current in a case where an absolute value of the voltage across current detection resistor 2 is in a range of, for example, 1.2 mV to 10 mV be detected, and the detected information is to be set in a "wake bit" of resistor 92 for detecting wake-up current. Herein, current of about 1 A is assumed to be detected, and an appropriate set value is set in resistor 92 for detecting wake-up current such that current is detected that makes the absolute value of the voltage across current detection resistor 2 become 2.4 mV (1 A×2.5 mΩ≈2.4 mV). The current detected in this manner is detected by comparator 91 for detecting wake-up current that is hardware, resulting in no missed detection and a small delay in detection.

Upon detecting overcurrent 2, CPU 51 makes MOSFETs 71, 72 OFF from I/P port 55 via buffers 83, 84, respectively, to cut off charging/discharging current, and writes information that should be informed to battery driven equipment 20 into communication unit 9. The written information is polled from control and power source unit 21 to be read out, and the read-out information is informed to a user by using battery driven equipment 20.

(Wake-up Current Detection Circuit)

As described above, the wake-up current detection circuit is a member for detecting output current in the power saving state (wake-up current). In the power saving state, when that the output current exceeds a wake-up current threshold is detected by the wake-up current detection circuit, operation of battery pack 10 transitions from the power saving state to the non-power saving state.

In the example of battery pack 10 illustrated in FIG. 1, the wake-up current detection circuit includes comparator 91 for detecting wake-up current and resistor 92 for detecting wake-up current. Comparator 91 for detecting wake-up current is connected with current detection resistor 2, detects corresponding output current (wake-up current) as a voltage drop by the output current flowing in current detection resistor 2, and compares the wake-up current with a predetermined wake-up current threshold. A value corresponding to the wake-up current threshold is preliminarily stored in resistor 92 for detecting wake-up current. In this manner, in the exemplary embodiment, the output current is detected and compared by detection of the voltage. In the description, the meaning of detection operation for detecting output current is thus used to include the case where detection operation for detecting output current is substituted by detection operation of the voltage of current detection resistor 2.

In this manner, the wake-up current detection circuit monitors the output current in the power saving state. Then, upon transitioning to the non-power saving state, the wake-up current detection circuit stops monitoring operation of the output current. In contrast, in the non-power saving state, the above-mentioned output current detection circuit monitors the output current. Then, when the output current detection circuit detects that conditions to transition from the non-power saving state to the power saving state are satisfied, the operation transitions to the power saving state, and the output current monitoring operation in the output current detection circuit is stopped. Then, the wake-up current detection circuit starts its operation and plays a role of a monitoring function of the output current (wake-up current monitoring function).

In this manner, the function of monitoring the output current is achieved by the output current detection current in the non-power saving state, and the wake-up current detection circuit in the power saving state. However, conditions to detect the output current by the respective circuits are different. That is, it is aimed that battery driven equipment 20 is in a normally operating state in the non-power saving sate, so that the output current also becomes large. Therefore, the range of the output current detected by the output current detection circuit is set higher, and a frequency of performing output current detection operation also becomes high. For example, the second cycle is set to be a high frequency of 250 ms, and the output current ranging from one several tenth to several amperes is detected.

In contrast, it is aimed that battery driven equipment 20 is in the sleep state or in a stop state during the power saving state, so that the output voltage becomes zero or a low level. The object of this state is to detect that battery driven equipment 20 is returned to normal operation. Therefore, the wake-up current detection circuit detects the output current in a range lower than the range of the output current in the non-power saving state, and a low frequency suffices in the detection operation. For example, the wake-up current threshold that becomes a threshold to return to the non-power saving state is set at 200 mA. Furthermore, the first cycle of performing the detection operation may be matched with the cycle of conversion operation of the A/D converter. For example, the first cycle is set at five seconds or the like. Then, when the wake-up current detection circuit detects that the output current exceeds the wake-up current threshold, battery pack 10 is immediately transitioned from the power saving state to the non-power saving state. In this manner, although both the output current detection circuit and the wake-up current detection circuit have a function of monitoring the output current, their objects differ, so that their capabilities required to detect current also differ. Therefore, in the exemplary circuit in FIG. 1, comparator 81 for detecting output current, to detect large current, and comparator 91 for detecting wake-up current, to detect small current, are separately prepared to ensure the accuracy in respective cases. In contrast, current detection resistor 2 is commonly used for comparator 91 for detecting wake-up current and comparator 81 for detecting output current to simplify the circuit configuration.

(Calibration)

Herein, a frequency of the current detection in the power saving state is low as compared with that in the non-power saving state, thereby failing to detect the output current during its interval period. On the other hand, to accurately gain the state of secondary battery 1 of the battery pack, monitoring battery information including the output current is important. In other words, it becomes important from the standpoints of battery protection and the like to also make the operation on the battery pack side promptly transition to the non-power saving state when battery driven equipment 20 is once returned to the normal operation state from the sleep sate or the stop state to work such a monitoring function of battery. To this end, the detection accuracy needs to be enhanced in order to surely detect that wake-up current becomes not less than the wake-up current threshold by the wake-up current detection circuit. As described above, the wake-up current detection circuit detects the output current by comparator 91 for detecting wake-up current. In doing so, a calibration is needed to calibrate a reference point to increase the accuracy of the current value to be detected and calculated by comparator 91 for detecting wake-up current. Therefore, battery pack 10 has a calibration function for performing such a calibration. The calibration function is provided by, for example, embedding the calibration member for calibrating the reference point of the wake-up current detection circuit in controller 5. When the calibration is executed by the calibration member and the reference point of comparator 91 for detecting wake-up current is determined, the voltage detected by current detection resistor 2 sets an offset value to adjust the voltage to be intended detection voltage, and renews the offset current threshold stored in resistor 92 for detecting wake-up current.

Figure 3:
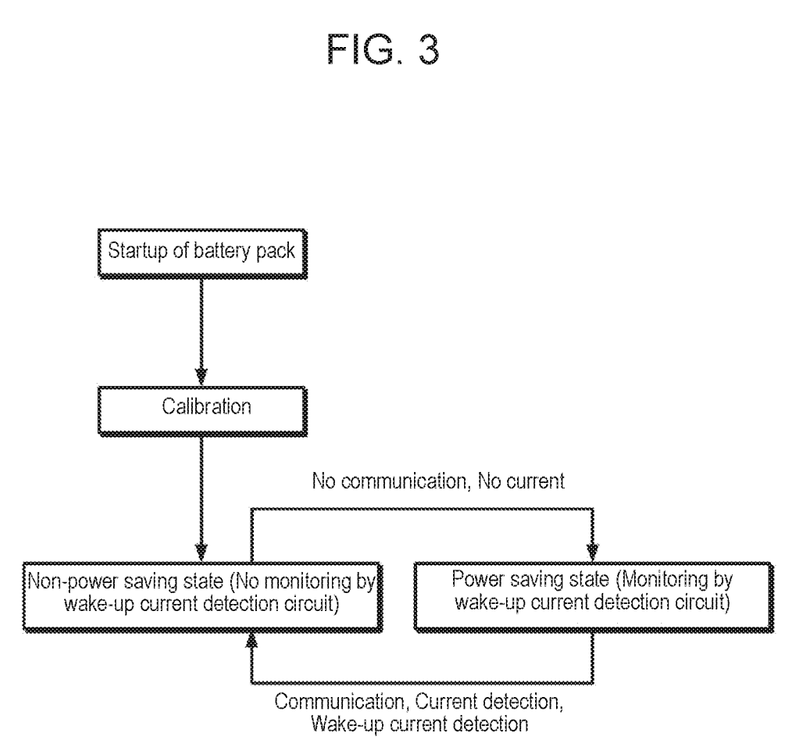
FIG. 3 is a state transition diagram illustrating timings for performing a calibration operation by a conventional battery pack and transitions between the non-power saving state and the power saving state in the conventional battery pack.

The reference point includes, for example, a zero point and a standard voltage. Such reference points fluctuate due to not only an individual difference for each comparator but also variation in ambient temperature that influences temperature characteristics of the comparator. Therefore, as illustrated in a state transition diagram of FIG. 3, the calibration operation has been conventionally performed once at the time of startup of the battery pack. However, the ambient temperature surrounding the battery pack changes after the time of startup of the battery pack, so that the reference point also fluctuates in conjunction with the variation of the ambient temperature. Specifically, the reference point of comparator 91 for detecting wake-up current fluctuates also by heat generation of secondary battery 1 and a power semiconductor element embedded in the battery pack. Fluctuation of the reference point causes problems such as disenabling the detection of the output current that should be intrinsically detected even when the output current reaches the wake-up current threshold and false detection of the output current as exceeding the wake-up current threshold even when the output current is a low current value that should not be detected.

Therefore, in the exemplary embodiment, the executing timing of the calibration operation is set not only at the time of startup of battery pack 10, but also at a predetermined timing also in the power saving state. Specifically, as illustrated in a state transition diagram of FIG. 2, the calibration operation is performed at a timing of transition from the non-power saving state to the power saving state. This makes it possible to reset detection voltage for each transition to the power saving state, thereby making it possible to absorb fluctuation of detection voltage due to temperature characteristics, by frequently renewing zero point.

Figure 2:
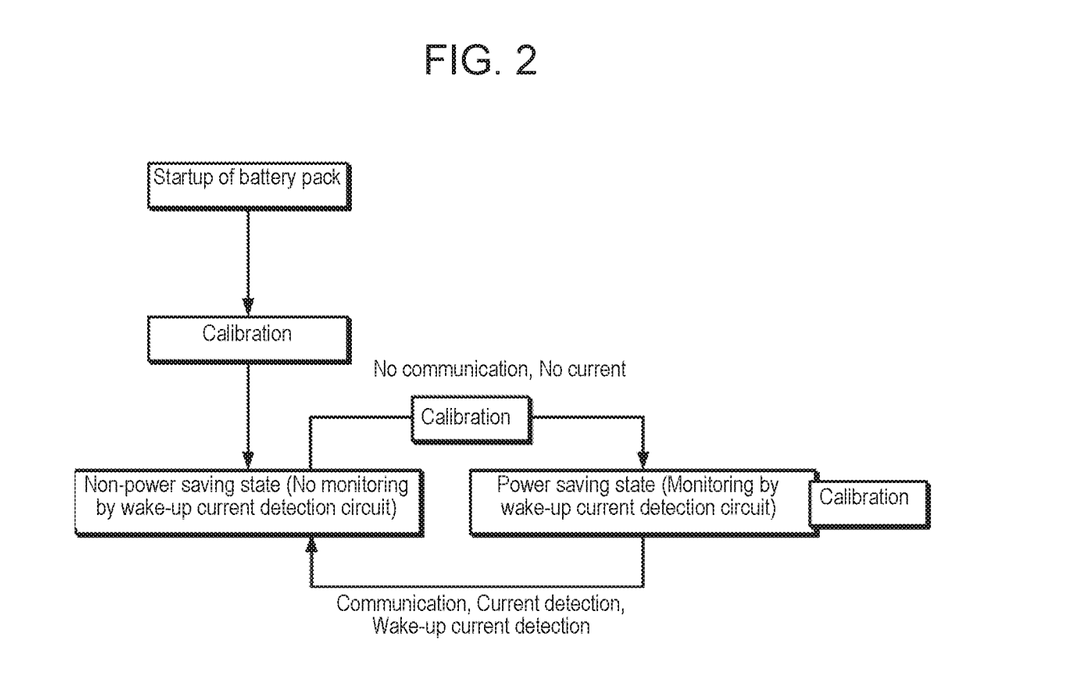
FIG. 2 is a state transition diagram illustrating timings for performing a calibration operation by the battery pack and transitions between a non-power saving state and a power saving state in the battery pack according to the exemplary embodiment.

Furthermore, during the power saving state, the calibration operation can also be performed periodically at the constant first cycle. The cycle of performing the calibration operation can be arbitrarily set, and for example, is set at every 5 sec. The first cycle is set longer than the second cycle at which the output current detection circuit detects the output current in the non-power saving state. This makes it possible to precisely gain the current integrated value to gain the state of the battery with higher accuracy by lengthening the detection cycle while almost no current is flown and there is no need to calculate the current integrated amount, whereas switching the first cycle to a shorter cycle at which the output current is detected to precisely detect the change amount of the output current when transition to the non-power saving state is once performed.

In this manner, it is possible to perform the calibration of the wake-up current detection current to precisely detect the output current that regulates the transition timing from the power saving state to the non-power saving state. In contrast, there is no need to calibrate the output current detection circuit that detects the output current in the non-power saving state. Specifically, the output current in the non-power saving state is significantly large as compared with a minute wake-up current in the power saving state, so that a minute error of a current detection value is not matter. In other words, it is sufficient to calibrate only the detection accuracy of minute current to precisely perform transition from the power saving state to the non-power saving state, so that separately providing the comparators and frequently calibrating only one of the comparators without increasing a frequency of calibration for the other comparator makes it possible to keep the balance between a cost and effect.

A battery pack according to the present invention can be suitably used as a power source for driving electronic equipment such as a notebook personal computer, a slate-shaped personal computer (tablet), a smartphone, and a mobile phone.

The invention claimed is:

1. A battery pack that is connected to battery driven equipment and that supplies a driving current to the battery driven equipment,
    the battery pack comprising:
    a secondary battery;
    a discharge controlling circuit configured to discharge the secondary battery and control an output current supplied to the battery driven equipment;
    a wake-up current detection circuit configured to, in a power saving state in which the output current supplied to the battery driven equipment by the discharge controlling circuit is reduced from a normal non-power saving state, detect that the output current exceeds a predetermined wake-up current threshold to make the battery pack transition from the power saving state to the non-power saving state; and
    a calibration member configured to calibrate a reference point of the wake-up current detection circuit,
    wherein
    the wake-up current detection circuit is configured to operate in the power saving state and stop operating in the non-power saving state, and
    the calibration member is configured to execute calibration operation at a predetermined timing in the power saving state.

2. The battery pack according to claim 1, wherein
    the calibration member is configured to execute the calibration operation at a predetermined first cycle after transition from the non-power saving state to the power saving state.

3. The battery pack according to claim 1, wherein
    the calibration member is configured to execute the calibration operation at a timing of transition from the non-power saving state to the power saving state.

4. The battery pack according to claim 1, wherein
    the reference point of the wake-up current detection circuit is a zero point where the output current becomes zero, and
    the calibration member corrects the zero point as the calibration operation.

5. The battery pack according to claim 4, wherein
    the calibration member is configured to determine the zero point of the wake-up current detection circuit and set an offset value that adjusts a detection voltage to be an intended voltage.

6. The battery pack according to claim 2, wherein
    the wake-up current detection circuit includes a comparator for detecting wake-up current, and
    the calibration member is configured to calibrate a reference value of the comparator for detecting wake-up current.

7. The battery pack according to claim 6, further comprising:
    an output current detection circuit configured to detect the output current in the non-power saving state; and
    a current detection resistor configured to detect a voltage dependent on the output current of the secondary batter,
    wherein
    the output current detection circuit includes a comparator for detecting output current, and
    the comparator for detecting wake-up current and the comparator for detecting output current are connected to a common current detection resistor.

8. The battery pack according to claim 7, wherein
    the output current detection circuit executes a detection operation for detecting the output current in the non-power saving state at a predetermined second cycle, and
    the second cycle is shorter than the first cycle.

9. A battery pack that is connected to battery driven equipment and that supplies a driving current to the battery driven equipment,
    the battery pack comprising:
    a secondary battery;
    a discharge controlling circuit configured to discharge the secondary battery and control an output current supplied to the battery driven equipment;
    a wake-up current detection circuit configured to, in a power saving state in which the output current supplied to the battery driven equipment by the discharge controlling circuit is reduced from a normal non-power saving state, detect that the output current exceeds a predetermined wake-up current threshold to make the battery pack transition from the power saving state to the non-power saving state; and
    a calibration member configured to calibrate a reference point of the wake-up current detection circuit,
    wherein
    the wake-up current detection circuit is configured to operate in the power saving state and stop operating in the non-power saving state, and
    the calibration member is configured to execute a calibration operation at a timing of transition from the non-power saving state to the power saving state.

10. A method for controlling discharge from a secondary battery by connecting a battery pack to battery driven equipment to supply a driving current to the battery driven equipment,
    the method comprising:
    a step of monitoring an output current supplied to the battery driven equipment from the battery pack and making a wake-up current detection circuit make the battery pack transition to a power saving state in which power consumption of the battery pack is reduced from a normal non-power saving state when the detected output current is not more than a predetermined wake-up current threshold; and
    a step of making a calibration member perform a calibration operation for calibrating a reference point of the wake-up current detection circuit at a predetermined timing in the power saving state, while making the wake-up current detection circuit monitor whether the output current exceeds the predetermined wake-up current threshold in the power saving state to make, when that the output current exceeds the predetermined wake-up current threshold is detected, the battery pack transition from the power saving state to the non-power saving state.

11. The method for controlling discharge from the secondary battery according to claim 10, wherein
the calibration operation is performed at a constant cycle after transition from the non-power saving state to the power saving state.

12. The method for controlling discharge from the secondary battery according to claim 10, wherein
the calibration operation is performed at a timing of transition from the non-power saving state to the power saving state.

* * * * *